US012786769B2

(12) United States Patent
Müller

(10) Patent No.: US 12,786,769 B2
(45) Date of Patent: *Nov. 3, 2026

(54) HANDLING LAYER 3 MEASUREMENTS OF A USER EQUIPMENT

(71) Applicant: Telefonaktiebolaget LM Ericsson (publ), Stockholm (SE)

(72) Inventor: Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 288 days.

This patent is subject to a terminal disclaimer.

(21) Appl. No.: 18/281,106

(22) PCT Filed: Mar. 17, 2021

(86) PCT No.: PCT/SE2021/050230
§ 371 (c)(1),
(2) Date: Sep. 8, 2023

(87) PCT Pub. No.: WO2022/197220
PCT Pub. Date: Sep. 22, 2022

(65) Prior Publication Data

US 2024/0147280 A1 May 2, 2024

(51) Int. Cl.
*H04W 24/10* (2009.01)
*H04W 36/00* (2009.01)

(52) U.S. Cl.
CPC ....... *H04W 24/10* (2013.01); *H04W 36/0094* (2013.01); *H04W 36/00692* (2023.05)

(58) Field of Classification Search
CPC ............. H04W 24/10; H04W 36/0094; H04W 36/00692; H04W 88/085; H04W 92/12
See application file for complete search history.

(56) References Cited

U.S. PATENT DOCUMENTS

2019/0208478 A1 7/2019 Park et al.
2019/0253966 A1* 8/2019 Park .................. H04W 52/0209
(Continued)

FOREIGN PATENT DOCUMENTS

CN 110958633 A 4/2020
CN 112166641 A 1/2021

OTHER PUBLICATIONS

International Search Report and Written Opinion of the International Searching Authority, PCT/SE2021/050230, mailed Nov. 19, 2021, 11 pages.
(Continued)

*Primary Examiner* — Kibrom T Hailu
(74) *Attorney, Agent, or Firm* — Sage Patent Group

(57) ABSTRACT

There is provided mechanisms for handling layer 3 measurements of a UE. A method is performed by a CU of an access network node. The CU is operatively connected to a DU of the access network node. The method includes configuring the UE to perform layer 3 measurements. The UE is configured to perform layer 3 measurements according to measurement IDs coordinated between the CU and the DU. A first subset of the measurement IDs is associated with the CU and a second subset of the measurement IDs is associated with the DU. The method includes obtaining a report with a layer 3 measurement from the UE. The report has one of the measurement IDs. The method includes performing an action that depends on the layer 3 measurement in the report only when the measurement ID of the report is one of the measurement IDs in the first subset.

18 Claims, 7 Drawing Sheets

(56) References Cited

U.S. PATENT DOCUMENTS

| | | | | |
|---|---|---|---|---|
| 2019/0373627 | A1* | 12/2019 | Luo | H04W 72/542 |
| 2021/0112504 | A1* | 4/2021 | Park | H04W 72/0453 |

OTHER PUBLICATIONS

International Search Report and Written Opinion of the International Searching Authority, PCT/SE2021/050231, mailed Nov. 19, 2021, 10 pages.

3GPP TS 38.401 v16.4.0 (Jan. 2021); 3rd Generation Partnership Project; Technical Specification Group Radio Access Network; NG-RAN; Architecture description (Release 16), 78 pages.

3GPP TS 38.331 v16.3.1 (Jan. 2021); 3rd Generation Partnership Project; Technical Specification Group Radio Access Network; NR; Radio Resource Control (RRC) protocol specification (Release 16), 932 pages.

3GPP TS 38.331 v15.11.0 (Sep. 2020); 3rd Generation Partnership Project; Technical Specification Group Radio Access Network; NR; Radio Resource Control (RRC) protocol specification (Release 15), 541 pages.

3GPP TS 38.473 v16.4.0 (Jan. 2021); 3rd Generation Partnership Project; Technical Specification Group Radio Access Network; NG-RAN; F1 application protocol (F1AP) (Release 16), 461 pages.

* cited by examiner

HANDLING LAYER 3 MEASUREMENTS OF A USER EQUIPMENT

CROSS REFERENCE TO RELATED APPLICATIONS

This application is a 35 U.S.C. § 371 national stage application of PCT International Application No. PCT/SE2021/050230 filed on Mar. 17, 2021, the disclosure and content of which is incorporated by reference herein in its entirety.

TECHNICAL FIELD

Embodiments presented herein relate to methods, a central unit, a distributed unit, computer programs, and a computer program product for handling layer 3 measurements of a user equipment.

BACKGROUND

In communications networks, there may be a challenge to obtain good performance and capacity for a given communications protocol, its parameters and the physical environment in which the communications network is deployed.

For example, in release 15 of the third generation partnership project (3GPP Rel-15) the concept of an access network node being split between a distributed unit (DU) and central unit (CU) was introduced. In this respect, one CU could, possibly, be operatively connected to a plurality of DUs FIG. 1 schematically illustrates a CU 200, a DU 300, and a UE 400. The CU 200 and the DU 300 communicate over the F1-AP protocol. According to the schematic illustration of FIG. 1, each of the CU 200, the DU 300, and the UE 400 comprises a respective RRC entity; a CU RRC entity 250 in the CU 200, a DU RRC entity 250 in the DU 300, and a UE RRC entity 450 in the UE 400 (where RRC is short for radio resource control). The RRC entities 250, 350, 450 are configured for handling of RRC messages. In this respect, the DU RRC entity 250 forwards RRC messages from the UE 400 to the CU 200 without considering the actual content of the RRC message.

According to some examples, the CU is a logical node that comprises access network node functionality such as transfer of user data, mobility control, radio access network sharing, positioning, session management etc., except those functions allocated exclusively to the DU. In some examples, the DU is a logical node comprises access network node functionality, depending on the functional split option between the CU and the DU. Its operation is controlled by the CU. In this respect, the CU might be responsible for the encoding of RRC messages with assistance information provided by the DU. This also allows the DU to report to the CU if a downlink RRC message has been successfully delivered to the UE or not.

In further detail, the current specified CU and DU functional division and F1-AP protocol defined in 3GPP TS 38.473 entitled "NG-RAN; F1 Application Protocol (F1AP)", version 16.4.0, specify that, with respect to handling of RRC messages, the CU is the logical node that is responsible for the RRC encoding and decoding of dedicated RRC messages with information provided by DU, and hence the CU RRC 250 is configured accordingly. It is further specified that the DU is the logical node responsible for transfer of RRC signaling from the CU to the UE over the air interface and for transfer of RRC signaling received from the UE over the air interface to the CU (where it is decoded and potentially acted on), and hence the DU RRC 350 and the UE RRC 450 are configured accordingly. Whilst this specification provides a standardized way for the CU and the DU to act on RRC messages, it also comes with some inflexibility.

Hence, there is a need for an improved handling of RRC messages with respect to the CU and the DU.

SUMMARY

An object of embodiments herein is to address the above issues by providing handling of RRC messages with respect to the CU and the DU where the above issues are resolved, or at least mitigated or reduced.

According to a first aspect there is presented a method for handling layer 3 measurements of a UE. The method is performed by a CU of an access network node. The CU is operatively connected to a DU of the access network node. The method comprises configuring the UE to perform layer 3 measurements. The UE is configured to perform layer 3 measurements according to measurement IDs coordinated between the CU and the DU. A first subset of the measurement IDs is associated with the CU and a second subset of the measurement IDs is associated with the DU. The method comprises obtaining a report with a layer 3 measurement from the UE. The report has one of the measurement IDs. The method comprises performing an action that depends on the layer 3 measurement in the report only when the measurement ID of the report is one of the measurement IDs in the first subset.

According to a second aspect there is presented a CU of an access network node for handling layer 3 measurements of a UE. The CU is operatively connected to a DU of the access network node. The CU comprises processing circuitry. The processing circuitry is configured to cause the CU to configure the UE to perform layer 3 measurements. The UE is configured to perform layer 3 measurements according to measurement IDs coordinated between the CU and the DU. A first subset of the measurement IDs is associated with the CU and a second subset of the measurement IDs is associated with the DU. The processing circuitry is configured to cause the CU to obtain a report with a layer 3 measurement from the UE. The report has one of the measurement IDs. The processing circuitry is configured to cause the CU to perform an action that depends on the layer 3 measurement in the report only when the measurement ID of the report is one of the measurement IDs in the first subset.

According to a third aspect there is presented a CU of an access network node for handling layer 3 measurements of a UE. The CU is operatively connected to a DU of the access network node. The CU comprises a configure module configured to configure the UE to perform layer 3 measurements. The UE is configured to perform layer 3 measurements according to measurement IDs coordinated between the CU and the DU. A first subset of the measurement IDs is associated with the CU and a second subset of the measurement IDs is associated with the DU. The CU comprises an obtain module configured to obtain a report with a layer 3 measurement from the UE. The report has one of the measurement IDs. The CU comprises an action module configured to perform an action that depends on the layer 3 measurement in the report only when the measurement ID of the report is one of the measurement IDs in the first subset.

According to a fourth aspect there is presented a computer program for handling layer 3 measurements of a UE. The computer program comprises computer program code which, when run on processing circuitry of a CU, causes the CU to perform a method according to the first aspect.

According to a fifth aspect there is presented a method for handling layer 3 measurements of a UE. The method is performed by a DU of an access network node. The DU is operatively connected to a CU of the access network node. The method comprises obtaining a report with a layer 3 measurement from the UE. The report has a measurement ID. The method comprises performing an action that depends on the layer 3 measurement in the report only when the measurement ID of the report is associated with the DU.

According to a sixth aspect there is presented a DU of an access network node for handling layer 3 measurements of a UE. The DU is operatively connected to a CU of the access network node. The DU comprises processing circuitry. The processing circuitry is configured to cause the DU to obtain a report with a layer 3 measurement from the UE. The report has a measurement ID. The processing circuitry is configured to cause the DU to perform an action that depends on the layer 3 measurement in the report only when the measurement ID of the report is associated with the DU.

According to a seventh aspect there is presented a DU of an access network node for handling layer 3 measurements of a UE. The DU is operatively connected to a CU of the access network node. The DU comprises an obtain module configured to obtain a report with a layer 3 measurement from the UE. The report has a measurement ID. The DU comprises an action module configured to perform an action that depends on the layer 3 measurement in the report only when the measurement ID of the report is associated with the DU.

According to an eighth aspect there is presented a computer program for handling layer 3 measurements of a UE, the computer program comprising computer program code which, when run on processing circuitry of a DU, causes the DU to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these aspects provide efficient handling of RRC messages with respect to the CU and the DU.

Advantageously, these aspects allow both the CU and the DU to use the 3GPP framework for UE layer 3 measurements at the same time and still allows the DU to act closer to real-time without interfering with CU actions on layer 3 measurements reported by the UE.

Advantageously, by coordination the measurements between the CU and the DU, each of the CU and the DU has the freedom to configure layer 3 measurements for its own purposes.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

As disclosed above, there is a need for an improved handling of RRC messages with respect to the CU and the DU In this respect, the current split between CU and DU, including the F1-AP message specification, does neither allow the DU to configure RRC messages for layer 3 measurements to be performed by the UE nor allows the DU to receive and act on received layer 3 measurements from the UE. This implies that real-time handling of layer 3 measurements is not available for the DU, and especially if latency on the interface between the CU and the DU will impair access network performance.

Figure 1:
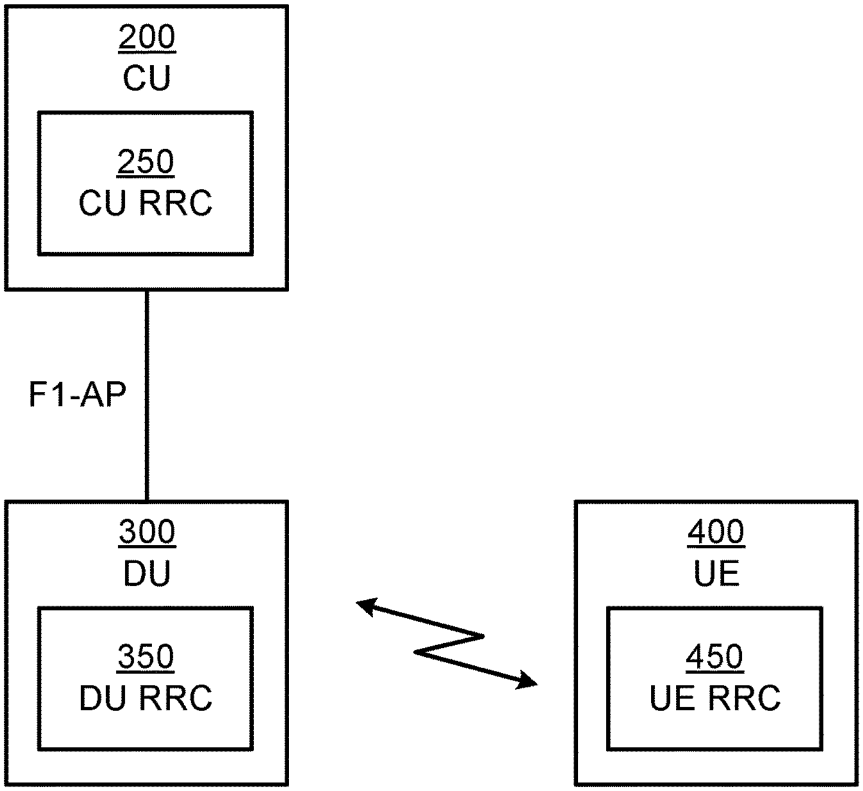
FIG. 1, FIG. 2 and FIG. 5 are schematic diagrams illustrating a communication network according to embodiments.
Figure 2:
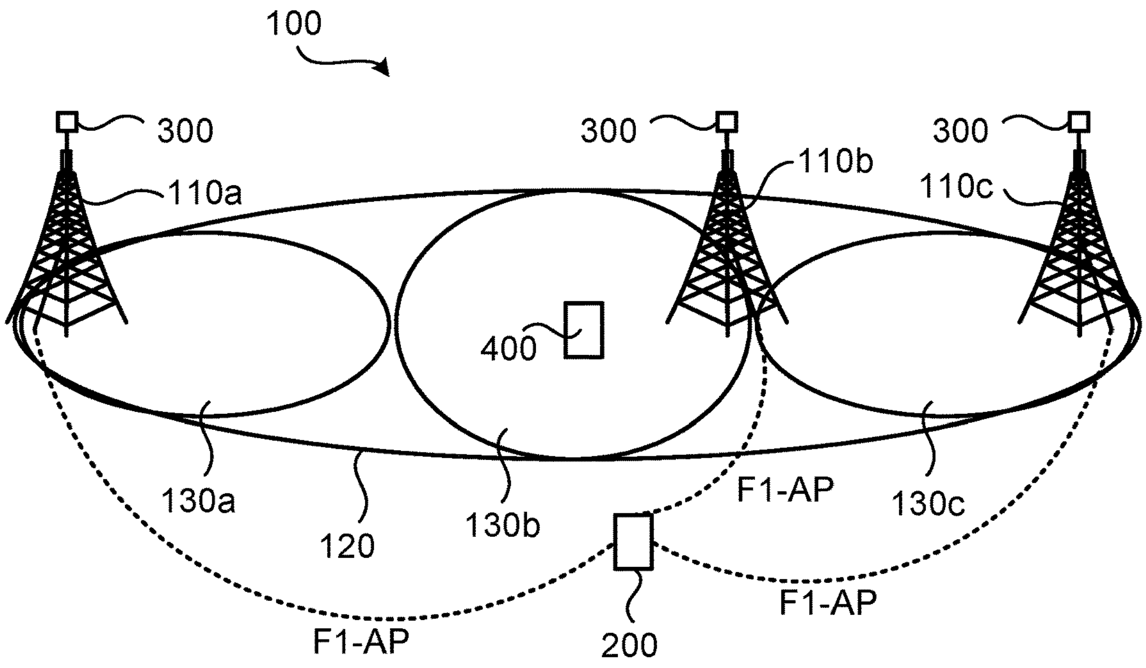

In turn, this prohibits the DU from using 3GPP specified UE event reporting for low latency real-time support of multi-TRP mobility. In this respect, a cell can consist of, or be served by, multiple TRPs, see FIG. 2. FIG. 2 schematically illustrates a communication network 100 comprising three TRPs 110*a*, 110*b*, 110*c*. Each TRP 110*a*:110*c* is equipped with its own DU 300 and all TRPs 110*a*:110*c* are operatively connected to one and the same CU 200. The TRPs 110*a*:110*c* collectively define, or serve, a multiple-TRP cell 120. In this respect, TRP 110*a* defines, or serves, a first cell 130*a*, TRP 110*b* defines, or serves, a second cell 130*b*, and TRP 110*c* defines, or serves, a third cell 130*c*. Usage of multiple-TRP cells 120 can be beneficial from an operator management simplicity point of view when the number of TRPs 110a:110c increase in the network e.g. indoor or stadium deployed systems, but also to enable certain performance enhancements such as diversity using joint transmission/reception, distributed mobility, seamless mobility, etc.

Further, since the UE 400 is only capable of a limited amount of layer 3 measurements, the CU 200 and the DUs 300 need to be coordinated to not configure more layer 3 measurements than what the UE 400 is capable of. Currently, there is no technology that allows both the CU 200 and the DUs 300 to use layer 3 measurements without interfering with each other in terms of maximum number of layer 3 measurements.

The embodiments disclosed herein therefore relate to mechanisms for handling layer 3 measurements of a UE 400. In order to obtain such mechanisms there is provided a CU 200, a method performed by the CU 200, a computer program product comprising code, for example in the form of a computer program, that when run on processing circuitry of the CU 200, causes the CU 200 to perform the method. In order to obtain such mechanisms there is further provided a DU 300, a method performed by the DU 300, and a computer program product comprising code, for example in the form of a computer program, that when run on processing circuitry of the DU 300, causes the DU 300 to perform the method.

Figure 3:
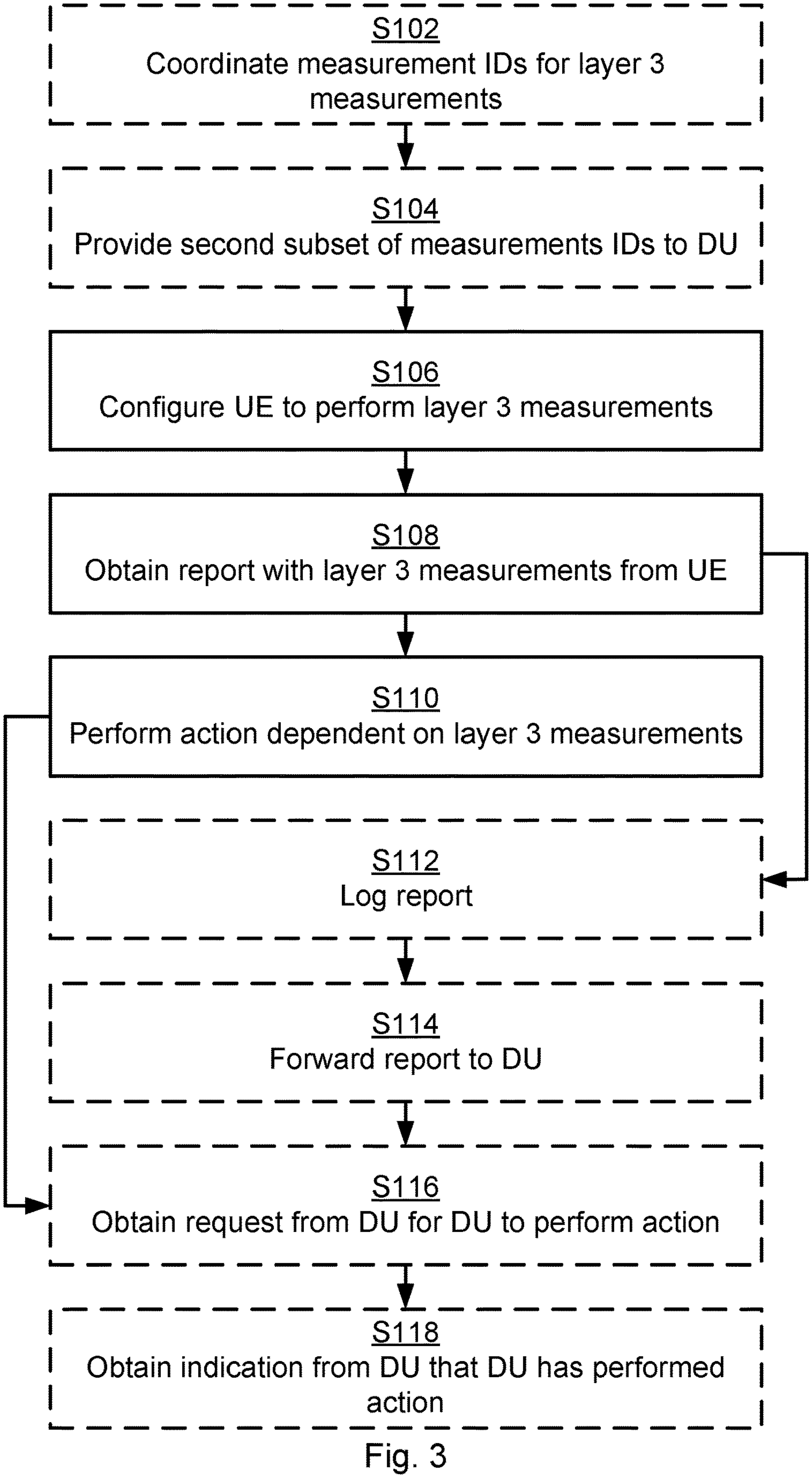
FIGS. 3 and 4 are flowcharts of methods according to embodiments.

Reference is now made to FIG. 3 illustrating a method for handling layer 3 measurements of a UE 400 as performed by a CU 200 of an access network node according to an embodiment. The CU 200 is operatively connected to a DU 300 of the access network node.

The CU 200 configures the UE 400 to perform layer 3 measurements. In particular, the CU 200 is configured to perform action S106:

S106: The CU 200 configures the UE 400 to perform layer 3 measurements. The UE 400 is configured to perform layer 3 measurements according to measurement IDs coordinated between the CU 200 and the DU 300. A first subset of the measurement IDs is associated with the CU 200 and a second subset of the measurement IDs is associated with the DU 300.

It is assumed that the CU 300 obtains a report with a layer 3 measurement originating from the UE 400. That is, the CU 200 is configured to perform action S108.

S108: The CU 200 obtains a report with a layer 3 measurement from the UE 400. The report has one of the measurement IDs.

The CU 200 then only takes action on its own measurement IDs. In particular, the CU 200 is configured to perform action S110:

S110: The CU 200 performs an action that depends on the layer 3 measurement in the report only when the measurement ID of the report is one of the measurement IDs in the first subset.

Embodiments relating to further details of handling layer 3 measurements of a UE 400 as performed by the CU 200 will now be disclosed.

In some non-limiting examples, the action performed in action S110 is an initiation of a handover from a serving cell to a target cell, as indicated by the report obtained in action S108.

As disclosed above, measurement IDs are coordinated between the CU 200 and the DU 300. In some embodiments, the CU 200 is therefore configured to perform (optional) action S102:

S102: The CU 200 coordinates the measurement IDs for layer 3 measurements of the UE 400 with the DU 300.

In some aspects, the CU 200 sends a copy of measurement configuration related to actions to be performed by the DU 300 to the DU 300. That is, in some embodiments, the CU 200 is therefore configured to perform (optional) action S104:

S104: The CU 200 provides the second subset of the measurement IDs to the DU 300.

It might be that the CU 200 receives a report that is addressed to the DU 300. Aspects relating thereto will now be disclosed. In general terms, common for all these aspects is that the CU 200 does not take any action that depends on the actual layer 3 measurement in the report.

In some aspects, the CU 200 logs reports that are addressed to the DU 300. That is, in some embodiments, the CU 200 is therefore configured to perform (optional) action S112:

S112: The CU 200 logs the report when the measurement ID of the report is not one of the measurement IDs in the first subset.

In some aspects, the CU 200 forwards reports that are addressed to the DU 300. That is, in some embodiments, the CU 200 is therefore configured to perform (optional) action S114:

S114: The CU 200 forwards the report to the DU 300 when the measurement ID of the report is not one of the measurement IDs in the first subset.

As will further be disclosed below, the DU 300 might request permission from the CU 200 for the DU 300 to take an action that depends on a further layer 3 measurement in a further report with the further layer 3 measurement received from the UE 400.

Therefore, in some embodiments, the CU 200 is configured to perform (optional) action S116:

S116: The CU 200 obtains a request from the DU 300 for the DU 300 to perform an action that depends on a further layer 3 measurement in a further report with the further layer 3 measurement from the UE 400. The measurement ID of the further report is one of the measurement IDs in the second subset.

The CU 200 might then grant the DU 300 to perform the action.

As will further be disclosed below, the DU 300 might then inform the CU 200 that the action has been performed. Hence, in some embodiments, the CU 200 is configured to perform (optional) action S118:

S118: The CU 200 obtaining S118 an indication from the DU 300 that the DU 300 has performed an action that depends on a further layer 3 measurement in a further report with the further layer 3 measurement from the UE 400. The measurement ID of the further report is one of the measurement IDs in the second subset.

Figure 4:
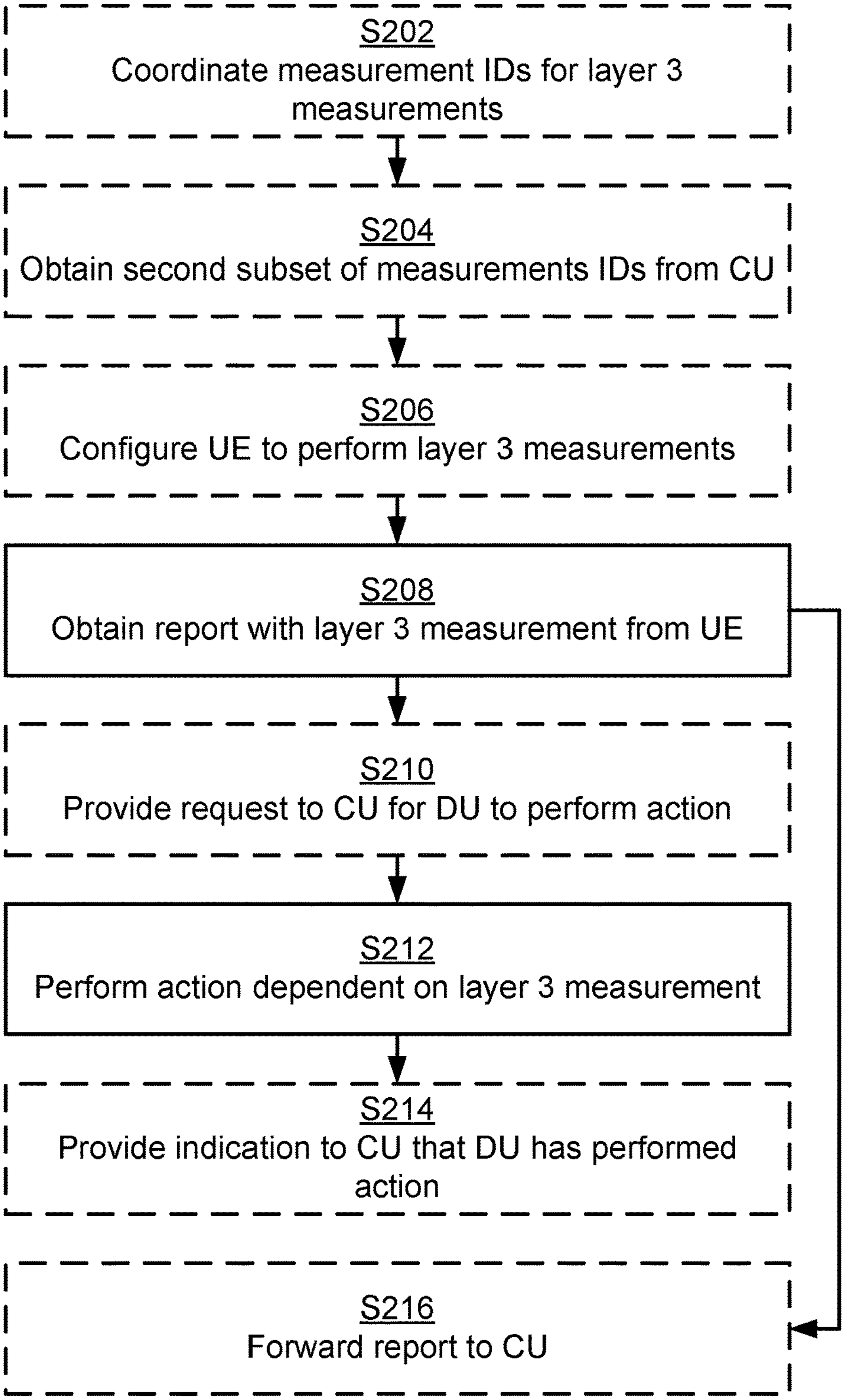

Reference is now made to FIG. 4 illustrating a method for handling layer 3 measurements of a UE 400 as performed by a DU 300 of an access network node according to an embodiment. The DU 300 is operatively connected to a CU 200 of the access network node.

It is assumed that the DU 300 obtains a report with a layer 3 measurement originating from the UE 400. That is, the DU 300 is configured to perform action S208.

S208: The DU 300 obtains a report with a layer 3 measurement from the UE 400. The report has a measurement ID.

The DU 300 then only takes action on its own measurement IDs. In particular, the DU 300 is configured to perform action S212:

S212: The DU 300 performs an action that depends on the layer 3 measurement in the report only when the measurement ID of the report is associated with the DU 300.

Embodiments relating to further details of handling layer 3 measurements of a UE 400 as performed by the DU 300 will now be disclosed.

In some non-limiting examples, the action performed in action S212 is initiation, or termination, of a downlink transmission from two or more TRPs 110*a*:100*c* towards the UE 400, where, as indicated by the report obtained in action S208.

As disclosed above, measurement IDs are coordinated between the CU 200 and the DU 300. In some embodiments, the DU 300 is therefore configured to perform (optional) action S202:

S202: The DU 300 coordinates measurement IDs for layer 3 measurements of the UE 400 with the CU 200. A first subset of the measurement IDs is associated with the CU 200 and a second subset of the measurement IDs is associated with the DU 300.

In some aspects the DU 300 might then configure the UE 400 to perform layer 3 measurements. That is, in some embodiments, the DU 300 is therefore configured to perform (optional) action S206:

S206: The DU 300 configures the UE 400 to perform layer 3 measurements according to the coordinating.

In this respect, the DU 300 might be limited to only configure the UE 400 to perform layer 3 measurements according to the second subset of the measurement IDs.

In other aspects, the DU 300 does not actively coordinate the measurement IDs for layer 3 measurements of the UE 400 with the CU 200. Instead, as disclosed above, in some aspects, the CU 200 sends a copy of measurement configuration related to actions to be performed by the DU 300 to the DU 300. Therefore, in some embodiments, the DU 300 is configured to perform (optional) action S204:

S204: The DU 300 obtains the second subset of the measurement IDs from the CU 200.

In some aspects the DU 300 receives a report addressed to the CU 200. The DU 300 might then forwards the report to the CU 200. That is, in some embodiments, the DU 300 is therefore configured to perform (optional) action S216:

S216: The DU 300 forwards the report to the CU 200 when the measurement ID of the report is not associated with the DU 300.

In some aspects, the report obtained in action S208 is received by the DU 300 directly from the UE 400. However, in other aspects, the report is obtained by the CU 200 that then forwards the report to the DU 300. That is, in some embodiments, the report is forwarded to the DU 300 from the CU 200.

In some aspects, the DU 300, before performing the action in S212 requests permission from the CU 200 for the DU 300 to take the action. That is, in some embodiments, the DU 300 is therefore configured to perform (optional) action S210:

S210: The DU 300 provides a request to the CU 200 for the DU 300 to perform the action.

The action in action S212 is then only performed when the DU 300 has been granted by the CU to perform the action.

In some aspects, upon having performed the action in action S212, the DU 300 informs the CU 200 that the action has been performed. Hence, in some embodiments, the DU 300 is configured to perform (optional) action S214:

S214: The DU 300 provides an indication to the CU 200 that the DU 300 has performed the action.

Figure 5:
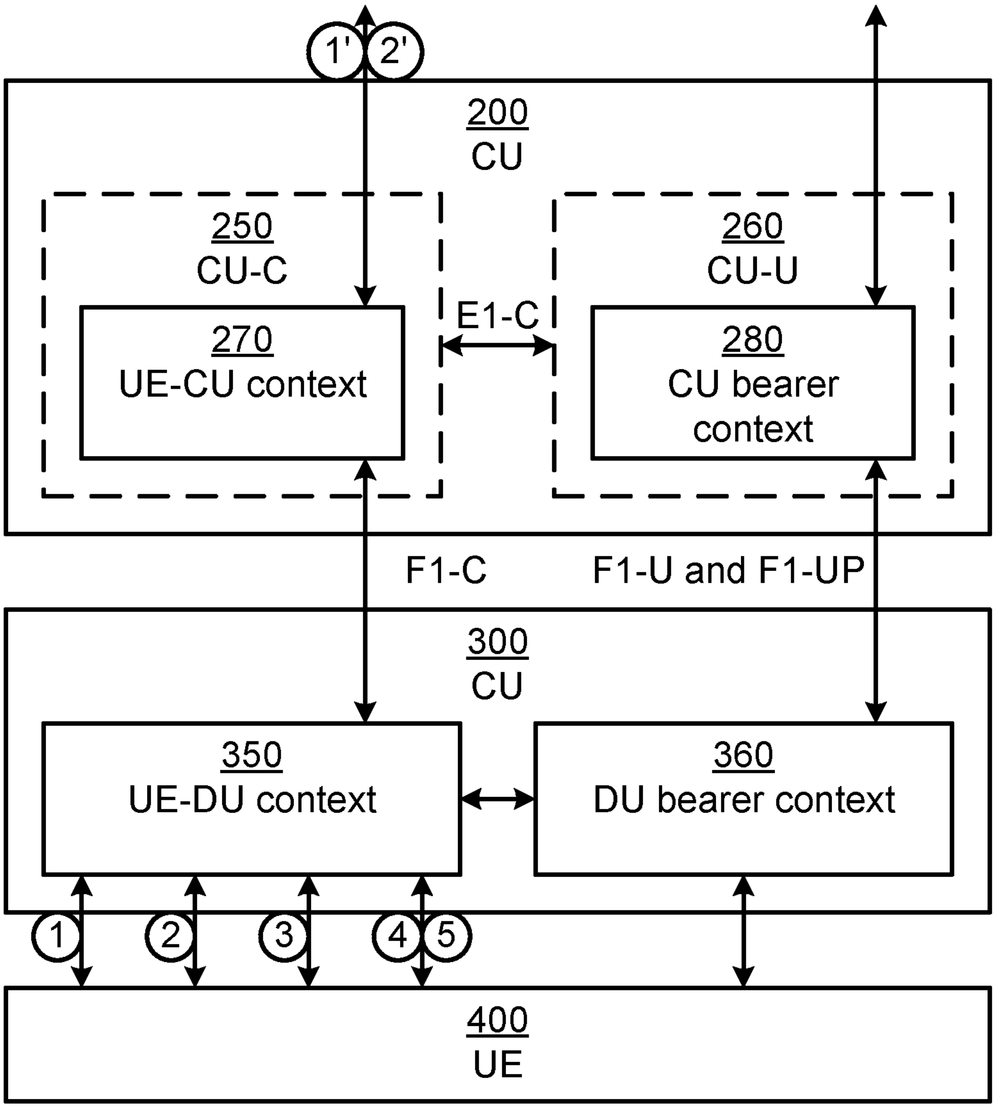

Three different examples encompassing at least some of the above disclosed embodiments for handling layer 3 measurements of a UE 400 will now be disclosed with reference to FIG. 5.

A first example is aimed at addressing real-time properties of handling the layer 3 measurements. The first example allows larger latency on the F1-AP interface than the second example.

The CU 200 sends a copy to the DU 300 of the measurement IDs related to actions to be performed by the DU 300, as in actions S104, S204.

The CU 200 configures the UE 400 to perform layer 3 measurements, as in action S106.

The UE 400 sends a report with a layer 3 measurement report. The report is received by the DU 300. The report comprises a measurement ID belonging to the DU 300.

The DU stores a copy of the report and requests permission from the CU 200 for the DU 300 to take an action that depends on the layer 3 measurement in the report, as in actions S116, S210.

The CU 200 recognizes that the report addressed to the DU 300 and takes no action that depends on the layer 3 measurement in the report except for logging the report, as in action S112 and grants permission for the DU 300 to perform the action. The action performed by the DU 300 is delayed two times the delay on the interface between the CU 200 and the DU 300 since the DU 300 requests permission from the CU 200 to perform the action.

The DU 300 performs an action that depends on the layer 3 measurement in the report, as in action S212.

A second example is aimed at addressing real-time properties of handling the layer 3 measurements. The second example results in lower latency than in the first example.

The CU 200 sends a copy to the DU 300 of the measurement IDs related to actions to be performed by the DU 300, as in actions S104, S204.

The CU 200 configures the UE 400 to perform layer 3 measurements, as in action S106.

The UE 400 sends a report with a layer 3 measurement report. The report is received by the CU 200. The report comprises a measurement ID belonging to the DU 300.

The CU stores a copy of the report, as in action S112, but does not take any action that depends on the layer 3 measurement in the report. The CU 200 forwards the report to the DU 300, as in action S114.

The report is received by the DU 300 from the CU 200. The DU 300 performs an action that depends on the layer 3 measurement in the report, as in action S212. The action performed by the DU 300 is delayed only one times the delay on the interface between the CU 200 and the DU 300 since the DU 300 does not request permission from the CU 200 to perform the action.

A third example is aimed at enabling mutual coordination between the CU 200 and the DU 300.

The CU 200 and the DU 300 coordinate measurement IDs for layer 3 measurements of the UE 400, as in actions S102, S202. A first subset of the measurement IDs is associated with the CU 200 and a second subset of the measurement IDs is associated with the DU 300.

The CU 200 configures the UE 400 to perform layer 3 measurements, as in action S106. The DU 300 configures the UE 400 to perform layer 3 measurements according to the coordinating, as in action S206.

The CU 200 performs an action that depends on the layer 3 measurement in the report only when the measurement ID of the report is one of the measurement IDs in the first subset, as in action S110. The DU 300 performs an action that depends on the layer 3 measurement in the report only when the measurement ID of the report is associated with the DU 300, as in action S212. The action performed by the DU 300 is not delayed with respect to the interface between the CU 200 and the DU 300 since the DU 300 directly can perform the action on its own reports.

FIG. 5 schematically illustrates the CU 200, the DU 300, and the UE 400 as well as some interfaces, E1-C, F1-C, F1-U and F1-UP, between these entities. The CU 200 implements a CU control (CU-C) functionality 250 and a CU user (CU-U) functionality 260. The CU-C 250 holds a UE-CU context handler 270 and the CU-U 260 holds a CU bearer context handler 280. The DU 300 holds a UE-DU context handler 350 and a DU bearer context handler 360. Encircled numbers 1, 2, 3, 4, 5, 1' and 2' represent actions. Encircled number 1 represents actions relating to RRC connection setup, encircled number 2 represents actions relating to RRC reconfiguration with measurement configuration, encircled number 3 represents actions relating to DU configured measurements, encircled number 4 represents actions relating to CU received measurement and acted upon by the DU, encircled number 5 represents actions relating to DU received measurement and acted upon by the DU, encircled number 1' and encircled number 2' represent actions relating to communication between the CU and an Access and Mobility management Function (AMF) (not shown). The details of those actions will be described next with reference to FIG. 6 where the same encircled numbers appear.

Figure 6:
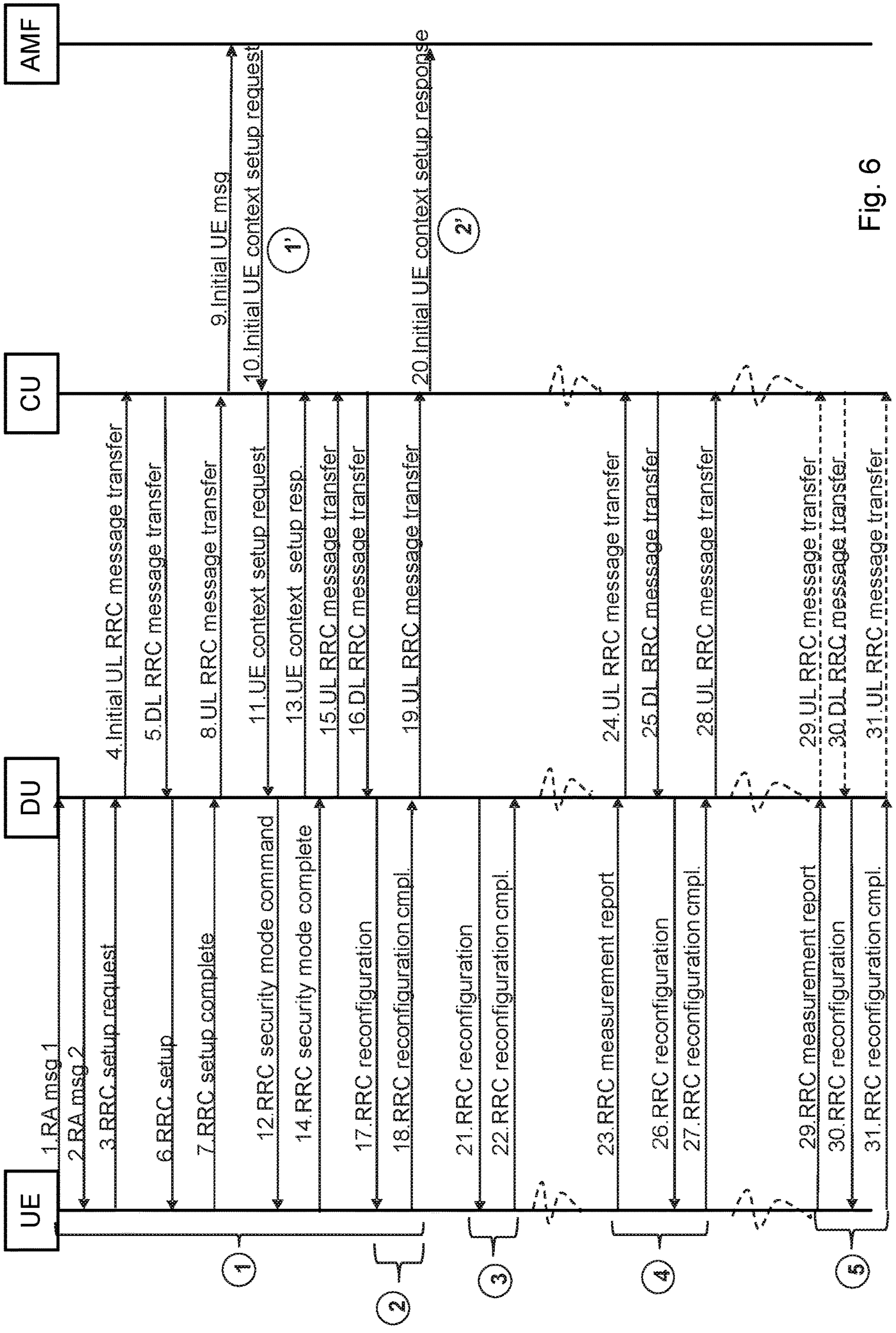
FIG. 6 is a signalling diagram according to embodiments.

One particular embodiment for handling layer 3 measurements of a UE 400 based on at least some of the above disclosed embodiments will now be disclosed in detail with reference to the signalling diagram of FIG. 6.

In actions 1 to 20 initial access and RRC connection setup is performed.

1. UE 400 sends a random access preamble on Layer 1 (RA msg 1).
2. DU 300 sends random access response (RA msg 2).
3. UE 400 sends an RRC Setup Request message to DU 300.
4. DU 300 includes the RRC message and, if the UE 400 is admitted, includes the corresponding low layer configuration for the UE 400 in the INITIAL UL RRC MESSAGE TRANSFER message and sends the message to CU 200.
5. CU 200 allocates a CU 200 UE 400 F1-AP identifier (ID) for the UE 400 and generates a RRCSetup message and sends the encapsulated RRC message in a DL RRC MESSAGE TRANSFER message to DU 300.
6. DU 300 sends the encapsulated RRC Setup message to UE 400.
7. UE 400 sends a RRC CONNECTION SETUP COMPLETE message to DU 300.
8. DU 300 encapsulates the RRC message in a UL RRC MESSAGE TRANSFER message and sends it to the CU 200.
9. CU 200 sends an INITIAL UE 400 MESSAGE message to the AMF 500.
10. AMF 500 sends an INITIAL CONTEXT SETUP REQUEST message to CU 200.
11. CU 200 sends a UE CONTEXT SETUP REQUEST message to establish the UE context in DU 300. This message may also encapsulate a Security Mode Command message to be sent to UE 400.
12. DU 300 sends a Security Mode Command message to the UE 400.
13. DU 300 sends a UE 400 CONTEXT SETUP RESPONSE message to CU 200.
14. UE 400 sends a Security Mode Complete message to DU 300.
15. DU 300 encapsulates the RRC message in a UL RRC MESSAGE TRANSFER message and sends it to CU 200.
16. CU 200 coordinates the message IDs and generates a RRC Reconfiguration message and encapsulates it in a DL RRC MESSAGE TRANSFER message and sends it to DU 300. Example: Assume that the MeasurementIDs have the Integer range 1 to K. One way of coordination is for the CU 200 is to start from MeasurementID 1 and allocate measurementIDs upwards for CU controlled measurements and allocate MeasurementID from K and downwards for DU controlled UE measurements.
17. DU 300 stores the measurement configuration with measurement IDs allocated for DU 300 and sends a RRCReconfiguration message to UE 400.
18. UE 400 sends a RRCReconfigurationComplete message to DU 300.
19. DU 300 encapsulates the RRC message in a UL RRC MESSAGE TRANSFER message and sends it to CU 200.
20. CU 200 sends an INITIAL CONTEXT SETUP RESPONSE message to AMF 500.

In optional actions 21 and 22 DU 300 may send its own RRC measurement configuration to UE 400.

21. DU 300 sends a RRCReconfiguration message to the UE 400 measurement IDs allocated to DU 300 and coordinated with CU 200.
22. UE 400 sends a RRCReconfiguration Complete message to DU 300.

In actions 23 to 28 DU 300 receives a measurement report with measurement ID allocated to CU 200 and CU 200 takes action in this case by sending an RRC reconfiguration to UE 400.

23. UE 400 sends an RRC measurement report to DU 300.
24. DU 300 checks the measurement ID, recognizes it to be a CU controlled measurement ID, encapsulates the RRC message in a UL RRC MESSAGE TRANSFER message and sends it to CU 200.
25. CU 200 generates a RRCReconfiguration message and encapsulates it in a DL RRC MESSAGE TRANSFER message and sends it to DU 300.
26. DU 300 sends a RRCReconfiguration message to UE 400.
27. UE 400 sends RRCReconfigurationComplete message to the DU 300.
28. DU 300 encapsulates the RRC message in a UL RRC MESSAGE TRANSFER message and sends it to CU 200.

In actions 29 to 31 DU 300 receives a measurement report with measurement ID allocated to DU 300 and DU 300 takes an action, in this case sending an RRC reconfiguration to UE 400. This could also be a DU local action such as sending a MAC control message to UE 400 or just starting a DL transmission from another TRP or switching TRP that receives uplink transmission from UE 400.

29. UE 400 sends an RRC measurement report to DU 300.
30. DU 300 checks the measurement ID and recognizes the measurement ID to be a DU controlled measurement, takes an action if needed, and, if needed, sends a RRCReconfiguration message directly to UE 400.
31. UE 400 sends a RRCReconfigurationComplete message to DU 300.

In general, measurement coordination between the CU 200 and the DU 300 according to the herein disclosed embodiments can be performed for all scenarios where the UE 400 is configured to perform measurements and report a result of the measurements to the network (as represented by the CU 200 or the DU). Hence. whilst an example relating to how the herein disclosed embodiments could be applied in the context of initial RRC setup, the herein disclosed embodiments can also be applied in other contexts, such as during handover, RRC resume and RRC re-establishment. Some non-limiting examples are provided next for completeness of this disclosure.

According to one example, the herein disclosed embodiments can be applied in the context of early measurements to be performed by a UE 400 when in RRC idle mode and RRC inactive/suspended mode as configured by the network. The UE 400 could be configured to report measurement results during, or directly after, the RRC connected mode setup procedure.

According to one example, the herein disclosed embodiments can be applied in the context of measurements to be performed by a UE 400 after initial access and RRC connection setup from RRC idle mode or RRC connection resume from RRC inactive/suspended mode.

According to one example, the herein disclosed embodiments can be applied in the context of measurements to be performed by a UE 400 after connecting to a new cell at handover. The measurement configuration can be signalled to the UE 400 as part of the handover signalling or directly after the change is done with separate signalling. The configuring may originate from a master network node or a secondary network node.

According to one example, the herein disclosed embodiments can be applied in the context of measurements to be performed by a UE 400 after setup/change of primary secondary cell (PSCell) or secondary cell (SCell) when dual connectivity (DC) or carrier aggregation (CA) is used. The measurement configuration can be signalled to the UE 400 as part of the setup/change signalling or directly after the change is done with separate signalling. The configuring may originate from a master network node or a secondary network node According to one example, the herein disclosed embodiments can be applied in the context of measurements to be performed by a UE 400 after RRC connection re-establishment According to one example, the herein disclosed embodiments can be applied whenever the network considers it to be relevant to change the measurement configuration at the UE 400.

In summary, at least some of the herein disclosed embodiments enable the CU 200 to configure the UE 400 with some layer 3 measurements with high real-time requirements and to provide the DU 300 with a copy of the measurement configurations related to these layer 3 measurements. These specific layer 3 measurements are coordinated between the CU 200 and DU 300 so that the measurement ID used is known by both the CU 200 and DU 300. This allows the CU 200 to act on some reports and the DU 300 to act on other reports, without interfering with each other.

Figure 7:
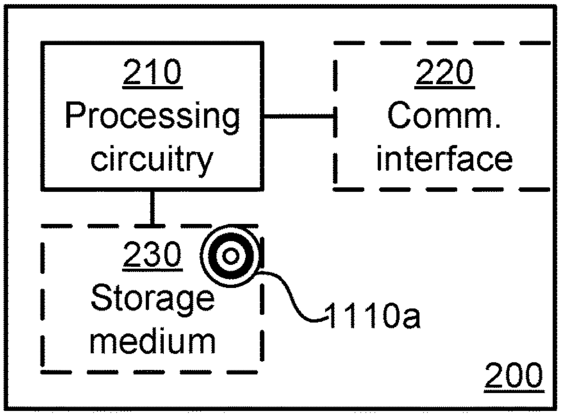
FIG. 7 is a schematic diagram showing functional units of a CU according to an embodiment.

FIG. 7 schematically illustrates, in terms of a number of functional units, the components of a CU 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110*a* (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the CU 200 to perform a set of operations, or actions, as disclosed above. For example, the storage medium 230 may store the set of operations, and the processing circuitry 210 may be configured to retrieve the set of operations from the storage medium 230 to cause the CU 200 to perform the set of operations. The set of operations may be provided as a set of executable instructions. Thus the processing circuitry 210 is thereby arranged to execute methods as herein disclosed. The processing circuitry 210 might implement the functionality of the CU RRC 250.

The storage medium 230 may also comprise persistent storage, which, for example, can be any single one or combination of magnetic memory, optical memory, solid state memory or even remotely mounted memory.

The CU 200 may further comprise a communications interface 220 for communications at least with the DU 300 and the UE 400. As such the communications interface 220 may comprise one or more transmitters and receivers, comprising analogue and digital components.

The processing circuitry 210 controls the general operation of the CU 200 e.g. by sending data and control signals to the communications interface 220 and the storage medium 230, by receiving data and reports from the communications interface 220, and by retrieving data and instructions from the storage medium 230. Other components, as well as the related functionality, of the CU 200 are omitted in order not to obscure the concepts presented herein.

Figure 8:
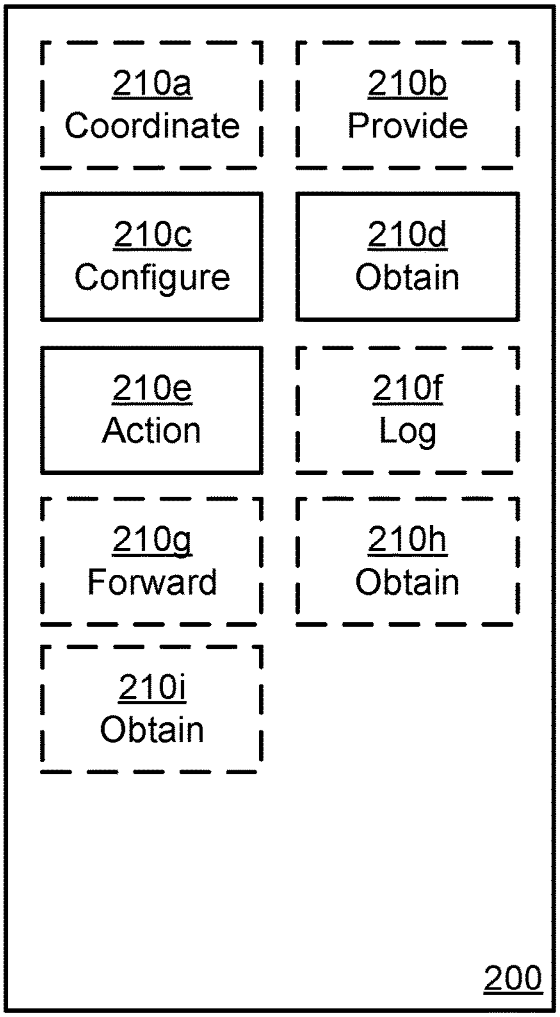
FIG. 8 is a schematic diagram showing functional modules of a CU according to an embodiment.

FIG. 8 schematically illustrates, in terms of a number of functional modules, the components of a CU 200 according to an embodiment. The CU 200 of FIG. 8 comprises a number of functional modules; a configure module 210*c* configured to perform action S106, a first obtain module 210*d* configured to perform action S108, and an action module 210*e* configured to perform action S110. The CU 200 of FIG. 8 may further comprise a number of optional functional modules, such as any of a coordinate module 210*a* configured to perform action S102, a provide module 210*b* configured to perform action S104, a log module 210*f* configured to perform action S112, a forward module 210*g* configured to perform action S114, a second obtain module 210*h* configured to perform action S116, and a third obtain module 210*i* configured to perform action S118.

In general terms, each functional module 210*a*:210*i* may be implemented in hardware or in software. Preferably, one or more or all functional modules 210*a*:210*i* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*:210*i* and to execute these instructions, thereby performing any actions of the CU 200 as disclosed herein.

Figure 9:
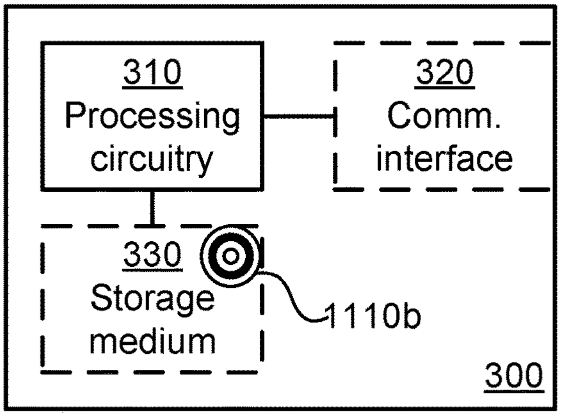
FIG. 9 is a schematic diagram showing functional units of a DU according to an embodiment.

FIG. 9 schematically illustrates, in terms of a number of functional units, the components of a DU 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110*b* (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the DU 300 to perform a set of operations, or actions, as disclosed above. For example, the storage medium 330 may store the set of operations, and the processing circuitry 310 may be configured to retrieve the set of operations from the storage medium 330 to cause the DU 300 to perform the set of operations. The set of operations may be provided as a set of executable instructions. Thus the processing circuitry 310 is thereby arranged to execute methods as herein disclosed. The processing circuitry 310 might implement the functionality of the DU RRC 350.

The storage medium 330 may also comprise persistent storage, which, for example, can be any single one or combination of magnetic memory, optical memory, solid state memory or even remotely mounted memory.

The DU 300 may further comprise a communications interface 320 for communications at least with the CU 200 and the UE 400. As such the communications interface 320 may comprise one or more transmitters and receivers, comprising analogue and digital components.

The processing circuitry 310 controls the general operation of the DU 300 e.g. by sending data and control signals to the communications interface 320 and the storage medium 330, by receiving data and reports from the communications interface 320, and by retrieving data and instructions from the storage medium 330. Other components, as well as the related functionality, of the DU 300 are omitted in order not to obscure the concepts presented herein.

Figure 10:
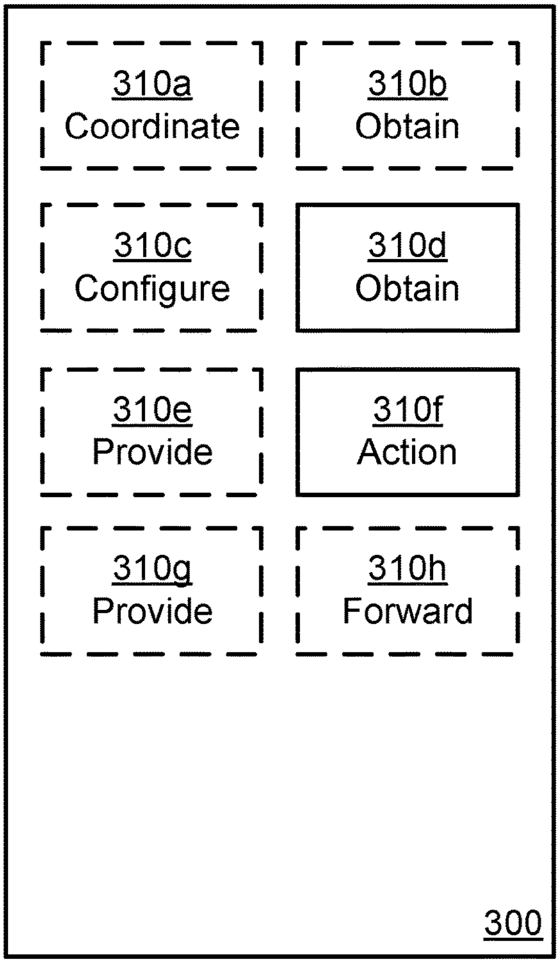
FIG. 10 is a schematic diagram showing functional modules of a DU according to an embodiment.

FIG. 10 schematically illustrates, in terms of a number of functional modules, the components of a DU 300 according to an embodiment. The DU 300 of FIG. 10 comprises a number of functional modules; a first obtain module 310*d* configured to perform action S208, and an action module 310*f* configured to perform action S212. The DU 300 of FIG. 10 may further comprise a number of optional functional modules, such as any of a coordinate module 310*a* configured to perform action S202, a second obtain module 310*b* configured to perform action S204, a configure module 310*c* configured to perform action S206, a first provide module 310*e* configured to perform action S210, a second provide module 310*g* configured to perform action S214, and a forward module 310*h* configured to perform action S216.

In general terms, each functional module 310*a*:310*h* may be implemented in hardware or in software. Preferably, one or more or all functional modules 310*a*:310*h* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*:310*h* and to execute these instructions, thereby performing any actions of the DU 300 as disclosed herein.

The CU 200 and/or the DU 300 may be provided as a standalone device or as a part of at least one further device. For example, the CU 200 and/or the DU 300 may be provided in a node of the radio access network or in a node of the core network. Alternatively, functionality of the CU 200 and/or the DU 300 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the CU 200 and/or the DU 300 may be executed in a first device, and a second portion of the instructions performed by the CU 200 and/or the DU 300 may be executed in a second device; the herein disclosed embodiments are not limited to any particular number of devices on which the instructions performed by the CU 200 and/or the DU 300 may be executed. Hence, the methods according to the herein disclosed embodiments are suitable to be performed by a CU 200 and/or the DU 300 residing in a cloud computational environment. Therefore, although a single processing circuitry 210, 310 is illustrated in FIGS. 7 and 9 the processing circuitry 210, 310 may be distributed among a plurality of devices, or nodes. The same applies to the functional modules 210*a*:210*i*, 310*a*:310*h* of FIGS. 8 and 10 and the computer programs 1120*a*, 1120*b* of FIG. 11.

Figure 11:
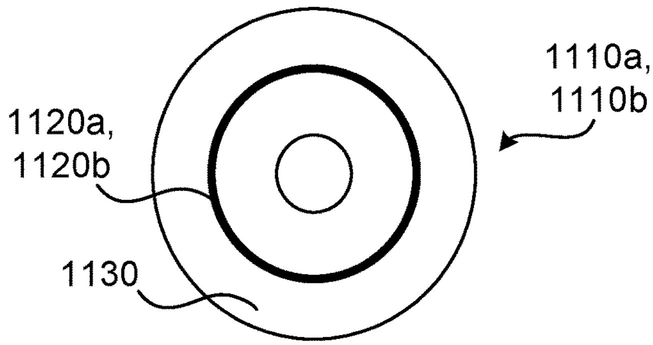
FIG. 11 shows one example of a computer program product comprising computer readable means according to an embodiment.

FIG. 11 shows one example of a computer program product 1110*a*, 1110*b* comprising computer readable means 1130. On this computer readable means 1130, a computer program 1120*a* can be stored, which computer program 1120*a* can cause the processing circuitry 210 and thereto operatively coupled entities and devices, such as the communications interface 220 and the storage medium 230, to execute methods according to embodiments described herein. The computer program 1120*a* and/or computer program product 1110*a* may thus provide means for performing any actions of the CU 200 as herein disclosed. On this computer readable means 1130, a computer program 1120*b* can be stored, which computer program 1120*b* can cause the processing circuitry 310 and thereto operatively coupled entities and devices, such as the communications interface 320 and the storage medium 330, to execute methods according to embodiments described herein. The computer program 1120*b* and/or computer program product 1110*b* may thus provide means for performing any actions of the DU 300 as herein disclosed.

In the example of FIG. 11, the computer program product 1110*a*, 1110*b* is illustrated as an optical disc, such as a CD (compact disc) or a DVD (digital versatile disc) or a Blu-Ray disc. The computer program product 1110*a*, 1110*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120*a*, 1120*b* is here schematically shown as a track on the depicted optical disk, the computer program 1120*a*, 1120*b* can be stored in any way which is suitable for the computer program product 1110*a*, 1110*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling layer 3 measurements of a user equipment, UE, the method being performed by a central unit, CU of an access network node, the CU being operatively connected to a distributed unit, DU of the access network node, the method comprising:

configuring the UE to perform layer 3 measurements, wherein the UE is configured to perform layer 3 measurements according to measurement IDs coordinated between the CU and the DU, where a first subset of the measurement IDs is associated with the CU and a second subset of the measurement IDs is associated with the DU;

obtaining a report with a layer 3 measurement from the UE, the report having one of the measurement IDs; and performing an action that depends on the layer 3 measurement in the report only when the measurement ID of the report is one of the measurement IDs in the first subset.

2. The method according to claim 1, wherein the method further comprises:

coordinating the measurement IDs for layer 3 measurements of the UE with the DU.

3. The method according to claim 1, wherein the method further comprises:

providing the second subset of the measurement IDs to the DU.

4. The method according to claim 1, wherein the method further comprises:

logging the report when the measurement ID of the report is not one of the measurement IDs in the first subset.

5. The method according to claim 1, wherein the method further comprises:

forwarding the report to the DU when the measurement ID of the report is not one of the measurement IDs in the first subset.

6. The method according to claim 1, wherein the method further comprises:

obtaining a request from the DU for the DU to perform an action that depends on a further layer 3 measurement in a further report with the further layer 3 measurement from the UE, when the measurement ID of the further report is one of the measurement IDs in the second subset.

7. The method according to claim 1, wherein the method further comprises:

obtaining an indication from the DU that the DU has performed an action that depends on a further layer 3 measurement in a further report with the further layer 3 measurement from the UE, when the measurement ID of the further report is one of the measurement IDs in the second subset.

8. A method for handling layer 3 measurements of a user equipment, UE, the method being performed by a distributed unit, DU, of an access network node, the DU being operatively connected to a CU of the access network node, the method comprising:

obtaining a report with a layer 3 measurement from the UE, the report having a measurement ID;

performing an action that depends on the layer 3 measurement in the report only when the measurement ID of the report is associated with the DU; and coordinating measurement IDs for layer 3 measurements of the UE with the CU, wherein a first subset of the measurement IDs is associated with the CU and a second subset of the measurement IDs is associated with the DU.

9. The method according to claim 8, wherein the method further comprises:

configuring the UE to perform layer 3 measurements according to the coordinating.

10. The method according to claim 8, wherein the method further comprises:

obtaining the second subset of the measurement IDs from the CU.

11. The method according to claim 8, wherein the method further comprises:

forwarding the report to the CU when the measurement ID of the report is not associated with the DU.

12. The method according to claim 8, wherein the report is forwarded to the DU from the CU.

13. The method according to claim 8, wherein the method further comprises:

providing a request to the CU for the DU to perform the action.

14. The method according to claim 8, wherein the method further comprises:

providing an indication to the CU that the DU has performed the action.

15. A central unit, CU, of an access network node for handling layer 3 measurements of a user equipment, UE, the CU being operatively connected to a distributed unit, DU, of the access network node, the CU comprising processing circuitry, the processing circuitry being configured to cause the CU to:

configure the UE to perform layer 3 measurements, wherein the UE is configured to perform layer 3 measurements according to measurement IDs coordinated between the CU and the DU, where a first subset of the measurement IDs is associated with the CU and a second subset of the measurement IDs is associated with the DU;

obtain a report with a layer 3 measurement from the UE, the report having one of the measurement IDs; and perform an action that depends on the layer 3 measurement in the report only when the measurement ID of the report is one of the measurement IDs in the first subset.

16. A central unit, CU, of an access network node for handling layer 3 measurements of a user equipment, UE, the CU being operatively connected to a distributed unit, DU, of the access network node, the CU comprising:

a configure module configured to configure the UE to perform layer 3 measurements, wherein the UE is configured to perform layer 3 measurements according to measurement IDs coordinated between the CU and the DU, where a first subset of the measurement IDs is associated with the CU and a second subset of the measurement IDs is associated with the DU;

an obtain module configured to obtain a report with a layer 3 measurement from the UE, the report having one of the measurement IDs; and an action module configured to perform an action that depends on the layer 3 measurement in the report only when the measurement ID of the report is one of the measurement IDs in the first subset.

17. A distributed unit, DU, of an access network node for handling layer 3 measurements of a user equipment, UE, the DU being operatively connected to a central unit, CU, of the access network node, the DU comprising processing circuitry, the processing circuitry being configured to cause the DU to:

obtain a report with a layer 3 measurement from the UE, the report having a measurement ID;

perform an action that depends on the layer 3 measurement in the report only when the measurement ID of the report is associated with the DU; and coordinate measurement IDs for layer 3 measurements of the UE with the CU, wherein a first subset of the measurement IDs is associated with the CU and a second subset of the measurement IDs is associated with the DU.

18. A non-transitory computer-readable storage medium for handling layer 3 measurements of a user equipment, UE, the non-transitory computer-readable storage medium storing computer code which, when run on processing circuitry of a central unit, CU, of an access network node, the CU being operatively connected to a distributed unit, DU, of the access network node, causes the CU to:

configure the UE to perform layer 3 measurements, wherein the UE is configured to perform layer 3 measurements according to measurement IDs coordinated between the CU and the DU, where a first subset of the measurement IDs is associated with the CU and a second subset of the measurement IDs is associated with the DU;

obtain a report with a layer 3 measurement from the UE, the report having one of the measurement IDs; and perform an action that depends on the layer 3 measurement in the report only when the measurement ID of the report is one of the measurement IDs in the first subset.

* * * * *